United States Patent [19]
Nagai et al.

[11] Patent Number: 5,161,209
[45] Date of Patent: Nov. 3, 1992

[54] SERVO CONTROL DEVICE FOR A VTR

[75] Inventors: Yasuo Nagai; Mitsugu Yoshihiro, both of Kanagawa, Japan

[73] Assignee: Sony Corporation, Tokyo, Japan

[21] Appl. No.: 825,088

[22] Filed: Jan. 24, 1992

[30] Foreign Application Priority Data

Jan. 30, 1991 [JP] Japan ................... 3-010203

[51] Int. Cl.⁵ ........................... G11B 15/467
[52] U.S. Cl. ................. 388/907.5; 360/73.01
[58] Field of Search ............ 318/568.1, 6, 7; 388/907.5; 242/54 R, 147 R, 190; 360/69, 70, 73.01, 73.02, 73.09

[56] References Cited

U.S. PATENT DOCUMENTS

| | | | |
|---|---|---|---|
| 4,893,198 | 1/1990 | Little | 360/14.1 |
| 4,939,596 | 7/1990 | Takayama et al. | 360/27 |
| 4,977,467 | 12/1990 | Kondo | 360/74.1 |
| 5,019,923 | 5/1991 | Ogaki | 360/73.07 |
| 5,039,027 | 8/1991 | Yanagihara et al. | 242/190 |
| 5,087,993 | 2/1992 | Kobayashi | 360/73.05 |
| 5,107,380 | 4/1992 | Fujiki et al. | 360/69 |

Primary Examiner—Bentsu Ro
Attorney, Agent, or Firm—Alvin Sinderbrand; William S. Frommer

[57] ABSTRACT

A drum servo circuit (310) is controlled by one (301) of a pair of microprocessors, and a reel servo circuit (220) and a capstan servo circuit (240) are controlled by the other microprocessor (201). Accordingly, the burden on each microprocessor is relatively light, and interrupt processing is performed with predetermined timing to improve servo performance. Further, tape movement can be controlled smoothly and quickly.

5 Claims, 6 Drawing Sheets

SERVO CONTROL DEVICE FOR A VTR

BACKGROUND OF THE INVENTION

The present invention relates to a servo control device for a VTR employing a microprocessor.

There is conventionally known, in Japanese Patent Laid-open Publication No. 58-186274, for example, a control system employing a microprocessor for controlling a drum servo, a capstan servo and a reel servo according to operation modes of a VTR.

As shown in FIG. 6, the above control system includes a single microprocessor 30. The microprocessor 30 is connected through a data bus 31 to a reel servo 32, a capstan servo 34, a scanning drum servo 36 and a machine communication interface 38, so that various operation modes of the VTR are controlled according to commands from a user or by remote control.

By way of example, interrupt request signals (IRQ) to microprocessor 30 are output from drum servo 36.

A reference generator 40 generates a system clock on the basis of a reference office composite synchronizing signal supplied thereto through a line 42, and synchronizes clock timing of microprocessor 30 and the servo circuits.

Microprocessor 30 is connected to an automatic scanning tracking servo 44 and a tape synchronizing processor 46. A tape composite synchronizing signal is supplied through a line 48 to processor 46, and an output from processor 46 is supplied to a time base correction interface 50.

When a single microprocessor is employed as mentioned above, the following problems occur with the servo circuits.

In the drum servo circuit, a phase servo and speed servo are concurrently employed. Feedback is carried out in the phase servo at the rate of rotation of a drum motor and at several times the rotational rate in the speed servo.

Accordingly, a speed detection interrupt routine is carried out by the microprocessor several times during each drum motor rotation. Therefore the higher the rotational speed of the drum motor, the more frequently interrupt routine is performed, with an increasing burden on the microprocessor.

In an ordinary analog VTR, the rotational speed of the drum is low, typically 30 rps. Accordingly, even when the interrupt routine is carried out six times per rotation of the drum, the interrupt period is relatively long, i.e. 5.5 mS.

However, in a D-1 type (also called a 4:2:2 type) VTR digital recording of a component type video signal (Y, R-Y, B-Y), the rotational speed of the a drum is set to a relatively high rate such as 150 rps. Accordingly, if the interrupt routine is carried out six times per rotation of the drum, for example, the period is shortened to 1.1 mS, causing an increase in the burden on the microprocessor.

In the capstan servo circuit, the rotational speed of the capstan motor is low, typically no more than 20 rps. Accordingly, even when an interrupt is carried out six times per rotation of the capstan motor, an the interrupt period is becomes relatively long, i.e. just over 8 mS, thus not causing any serious problems.

In the reel servo circuit, it is necessary for the response of the tension servo to be as rapid as about 100 Hz. Further, it is necessary to carry out feedback at the rate of 500 times/S or more, for example, in order to also reduce phase lag up to 100 Hz. In other words, interrupt processing with a short period of 2 mS, for example, is required, which causes an increase in the burden on the microprocessor.

Further, when three kinds of servos are processed by a single microprocessor as mentioned above, the interrupt frequency is increased. As a result, the burden on the microprocessor is further increased, and interrupt processing overlaps more causing a process waiting state, with the result that interrupt processing cannot be carried out at a predetermined timing thereby reducing servo performance.

To avoid reduction in servo performance as mentioned above, it may be considered to control the three kinds of servos by means of respective independent microprocessors.

However, in this case, the reel servo and the capstan servo, which are closely related to each other in terms of tape movement control, are undesirably separated. As a result, there is a problem with tape movement control, in which selection between reel movement mode and capstan movement mode becomes uneven and slow, or acceleration and deceleration during capstan operation become slow.

SUMMARY OF THE INVENTION

It is accordingly an object of the present invention to provide a servo control device for a VTR which can ease the burden on the microprocessor, allow interrupt processing to occur with predetermined timing to improve servo performance, and control tape movement smoothly and quickly.

According to the present invention, there is provided in a servo control device for VTR having a drum servo for controlling rotation of a drum mounting a magnetic head thereon, a reel servo for controlling rotation of a take-up reel and a supply reel, a capstan servo for controlling rotation of a capstan, and processing means for controlling each of the servo according to various operation modes; an improvement in which the processing means comprises a pair of microprocessors (201) and (301), the drum servo (310) being controlled by one of the microprocessors, the reel servo (220) and the capstan servo (240) being controlled by the other microprocessor.

With this construction, the burden on each microprocessor is lessened, and interrupt processing occurs with predetermined timing to improve servo performance. Furthermore, tape movement can be controlled smoothly and quickly.

Other objects and features of the invention will be more fully understood from the following detailed description and appended claims when considered with the accompanying drawings.

DETAILED DESCRIPTION OF THE PREFERRED EMBODIMENT

There will now be described with reference to FIGS. 1-5 a preferred embodiment in which a servo control device for a VTR according to the present invention is applied to a D-1 type VTR.

Figure 1:
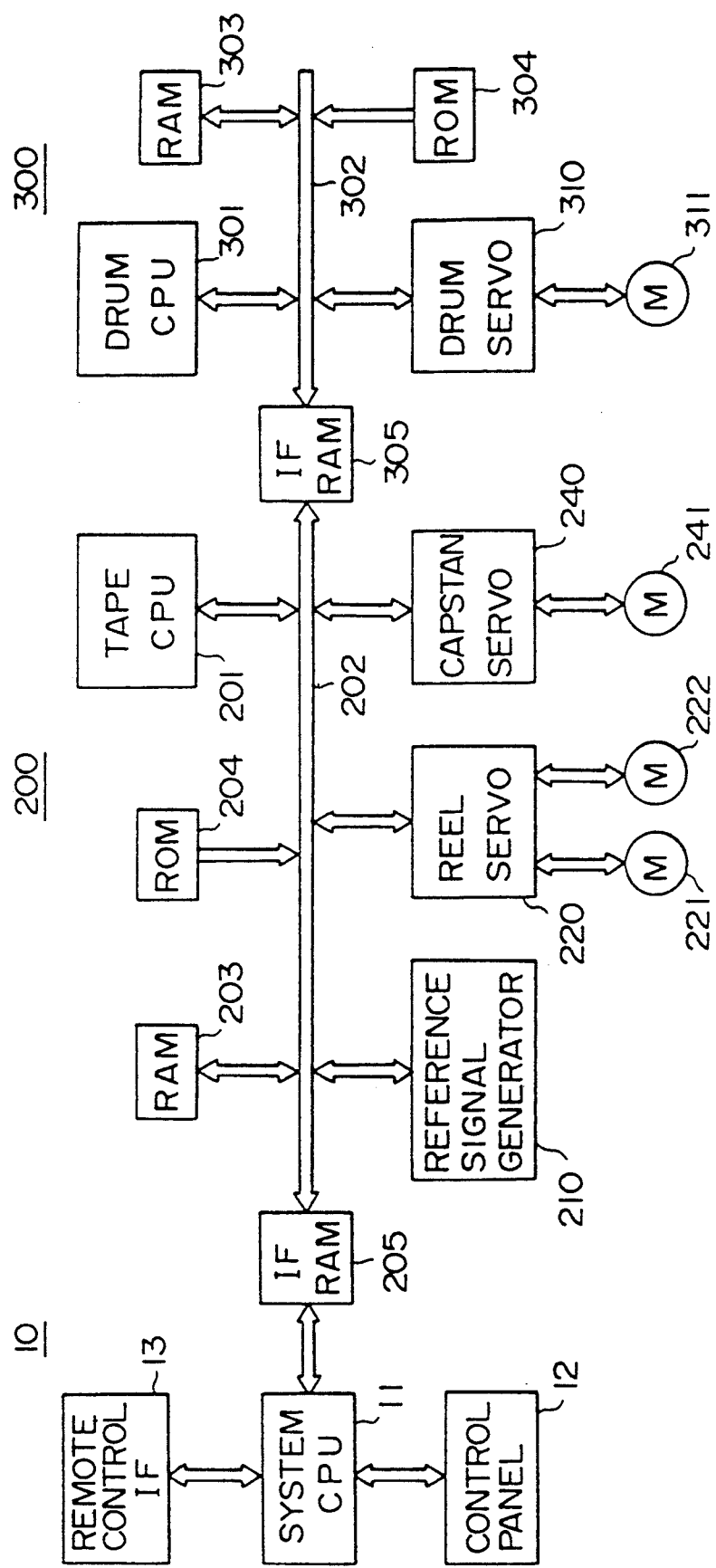
FIG. 1 is a block diagram illustrating a general construction of a preferred embodiment of the servo control device for a VTR according to the present invention.

FIG. 1 shows the general construction of the preferred embodiment of the present invention, and FIGS. 2 to 5 show constructions of circuits making up essential parts of the preferred embodiment.

Referring to FIG. 1, reference numeral 10 designates a control system for the servo control device including a system microprocessor (CPU) 11, a control panel 12 and a remote control I/O port 13.

Reference numeral 200 designates a tape movement control system including a microprocessor (CPU) 201, a reference signal generating circuit 210, a reel servo circuit 220 and a capstan servo circuit 240. Circuits 210, 220 and 240 and microprocessor 201 are connected together by means of a data bus 202. Further, a RAM 203, a ROM 204 and an interface RAM 205 are connected to data bus 202. Tape movement control system 200 is connected through the interface RAM 205 to control system 10.

As will be hereinafter described in detail, rotation of supply reel motor 211 and a take-up reel motor 222 is controlled by reel servo circuit 220, and rotation of a capstan motor 241 is controlled by capstan servo circuit 240.

Reference numeral 300 designates a drum control system including a microprocessor (CPU) 301 and a drum servo circuit 310, both being connected together by means of a data bus 302. Further, a RAM 303, a ROM 304 and an interface RAM 305 are connected to data bus 302. Drum control system 300 is connected through interface RAM 305 to tape movement control system 200.

Drum servo circuit 320 controls rotation of motor 311 for driving a drum (not shown) with a magnetic head mounted thereon.

Figure 2:
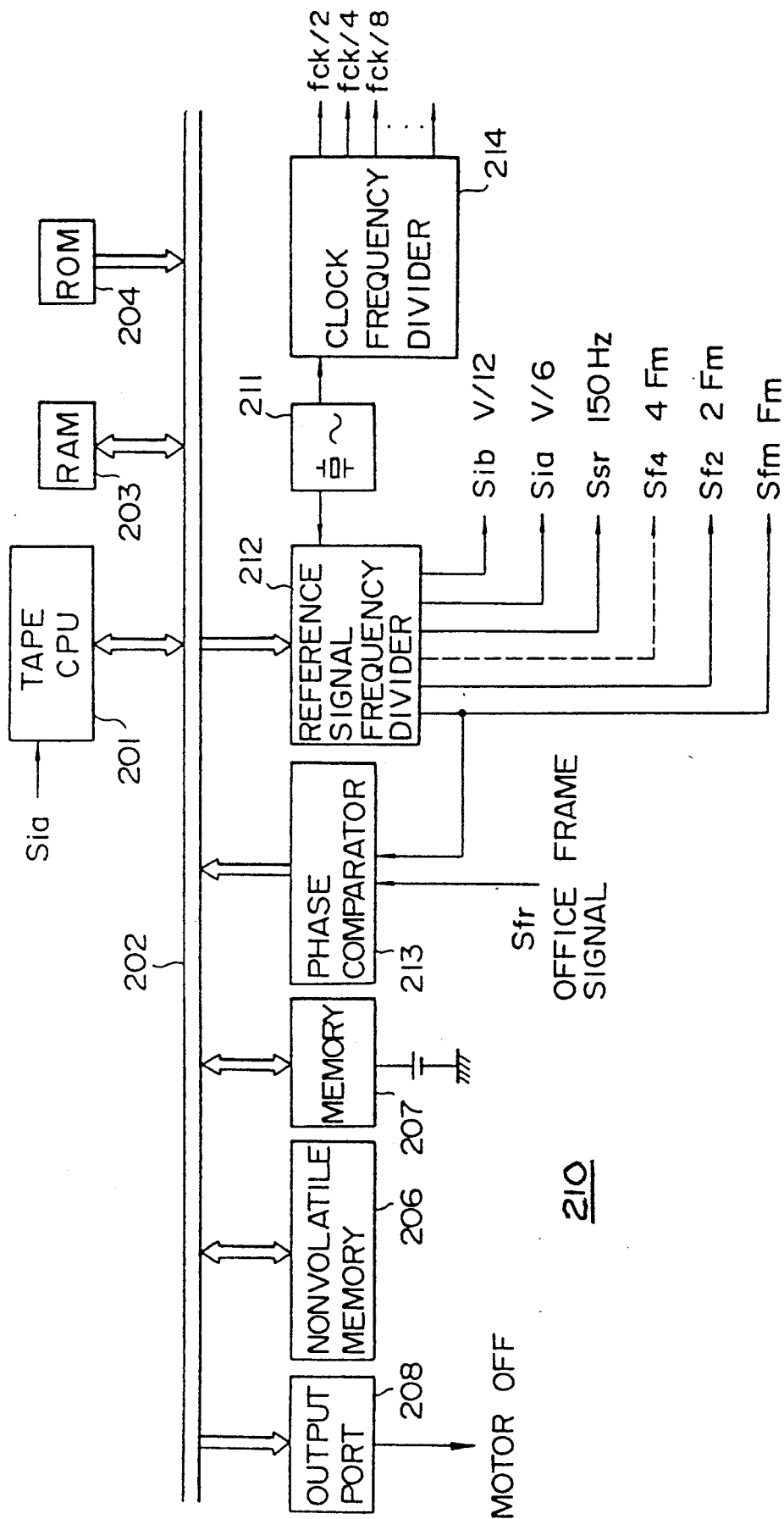
FIG. 2 is a block diagram illustrating a reference signal generating circuit that is part of the servo control device of FIG. 1.

Referring to FIG. 2 which shows the construction of the reference signal generating circuit 210, an output from a crystal oscillator 211 is supplied to a frequency divider 212 which generates reference signals. Frequency divider 212 forms reference signals Sfm, Sf2 and Sf4 having periods of Fm, 2Fm and 4Fm, respectively, where Fm represents a frame period, a servo reference signal (CTL pulse) Ssr having a repetition frequency of 150 Hz, and interrupt signals Sia and Sib having periods of V/6 and V/12, respectively. Interrupt signals Sia and Sib are synchronous in timing with frame signal Sfm.

The reference frame signal Sfm output from frequency divider 212 is compared in phase with a frame signal Sfr separated from an external reference signal (office composite synchronizing signal) in a phase comparator 213, and phase difference data from the phase comparator 213 is fed back to frequency divider 212, thereby synchronizing the outputs from reference signal generating circuit 210 in phase with external reference signal Sfr.

In a 525/60 system, signals Sfm and Sf2 are used as a frame signal and a color frame signal, respectively, while in a 625/50 system, signals Sfm, Sf2 and Sf4 are used as a frame signal, a color field signal and a color frame signal, respectively.

Further, the output from crystal oscillator 211 is supplied to a clock frequency divider 214 to form various clock signals having predetermined frequencies.

Servo adjustment data that varies from VTR to VTR are stored in a nonvolatile memory 206 at the time of production or maintenance. The data are copied to RAM on start-up of the VTR, and are used as parameters for the servo circuits.

During operation of the VTR, primary data for the system and the servo circuits are periodically stored a battery backup memory 207. The data are analyzed to detect malfunctions.

Further, if there is detected a malfunction such as an increase in temperature in the motors or a failure of an FG or PG, a stop command is output through an output port 208 to driving circuits for all the motors.

Figure 3:
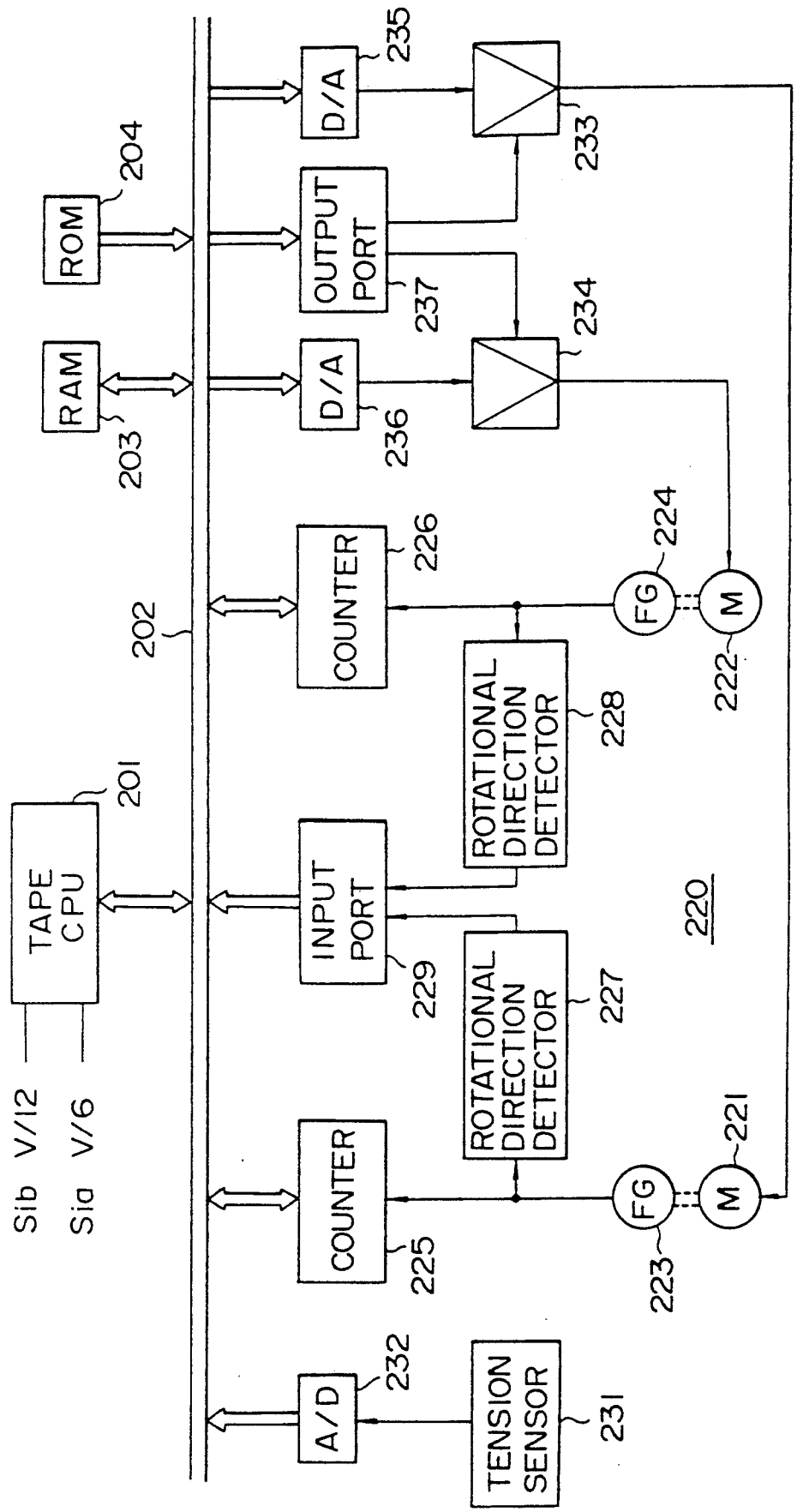
FIG. 3 is a block diagram illustrating a reel servo circuit that is part of the servo control device of FIG. 1.

Referring to FIG. 3 which shows the construction of reel servo circuit 220, FGs 223 and 224 are connected to supply reel motor 221 and the take-up reel motor 222, respectively. Reel FG pulses from FGs 223 and 224 are supplied to counters 225 and 226, respectively, and are also supplied to rotational direction detecting circuits 227 and 228, respectively. Counters 225 and 226 are directly connected to data bus 202, and detecting circuits 227 and 228 are connected through an input port 229 to data bus 202. A tension sensor 231 is connected through an A-D converter 232 to data bus 202.

Interrupt signals Sia and Sib mentioned above are supplied to microprocessor 201. Accordingly, data from counters 225 and 226 is fetched by microprocessor 201 with a period of V/6, and data from tension sensor 231 is fetched by microprocessor 201 with a period of V/12.

Driving amplifiers 233 and 234 are connected to reel motors 221 and 222, respectively. A driving signal from microprocessor 201 is supplied through D-A converters 235 and 236 to amplifiers 233 and 234, respectively, and a rotational direction signal from microprocessor 201 is supplied through an output port 237 to amplifiers 233 and 234.

Figure 4:
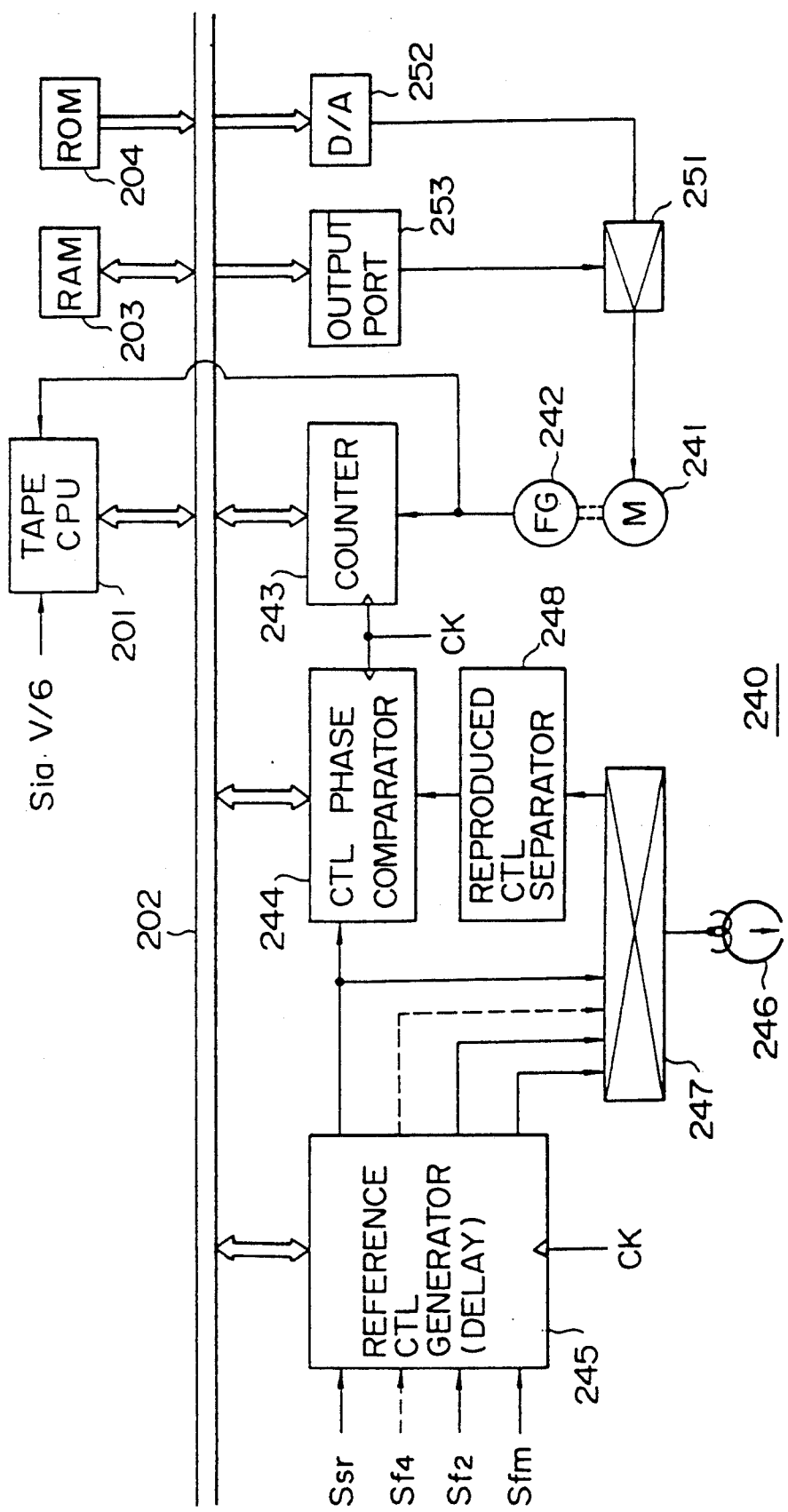
FIG. 4 is a block diagram illustrating a capstan servo control device of FIG. 1 part of the preferred embodiment of the present invention.

Referring to FIG. 4 which shows the construction of the capstan servo circuit 240, an FG 242 is connected to capstan motor 241. Capstan FG pulses from FG 242 are supplied to a counter 243, and are also supplied as interrupt signals to the microprocessor 201. Clock CK is supplied to counter 243, and a clock count value during every FG period is output from counter 243.

Reference CTL pulse Ssr from frequency divider 212 shown in FIG. 2 is supplied through a delay circuit 245 to a phase comparator 244, and a reproduced CTL pulse from a CTL head 246 is supplied through a selector switch 247 and a CTL separating circuit 248 to phase comparator 244. Both CTL pulses are compared in phase with each other, and a phase difference data from phase comparator 244 is fetched by microprocessor 201.

In recording mode, reference signals Sfm–Sf4 as a frame signal, a color frame signal, etc. are supplied together with reference CTL pulse Ssr from delay circuit 245 to CTL head 246.

A driving amplifier 251 is connected to capstan motor 241. A driving signal from microprocessor 201 is supplied through a D-A converter 252 to amplifier 251, and a rotational direction signal from microprocessor 201 is supplied through an output port 253 to amplifier 251.

Figure 5:
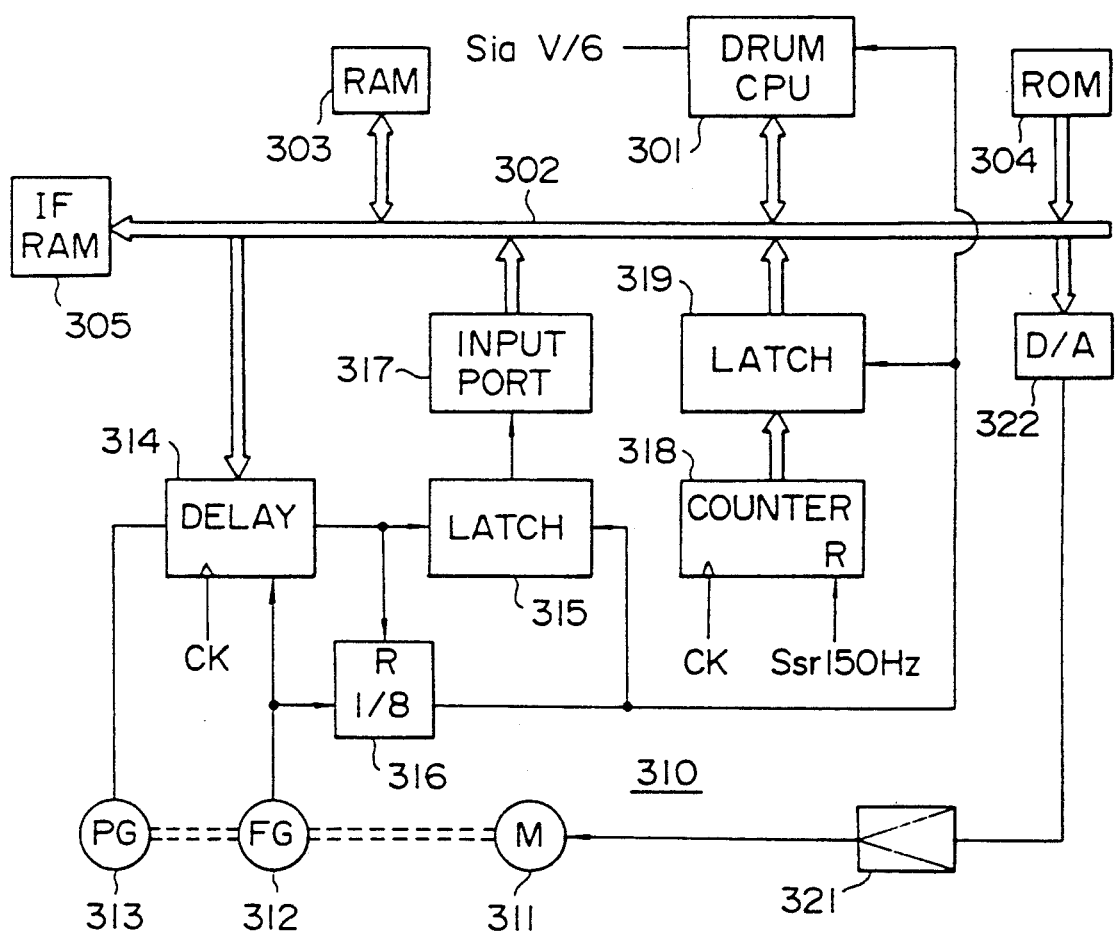
FIG. 5 is a block diagram illustrating a drum servo circuit that is part of the servo control device of FIG. 1.
Figure 6:
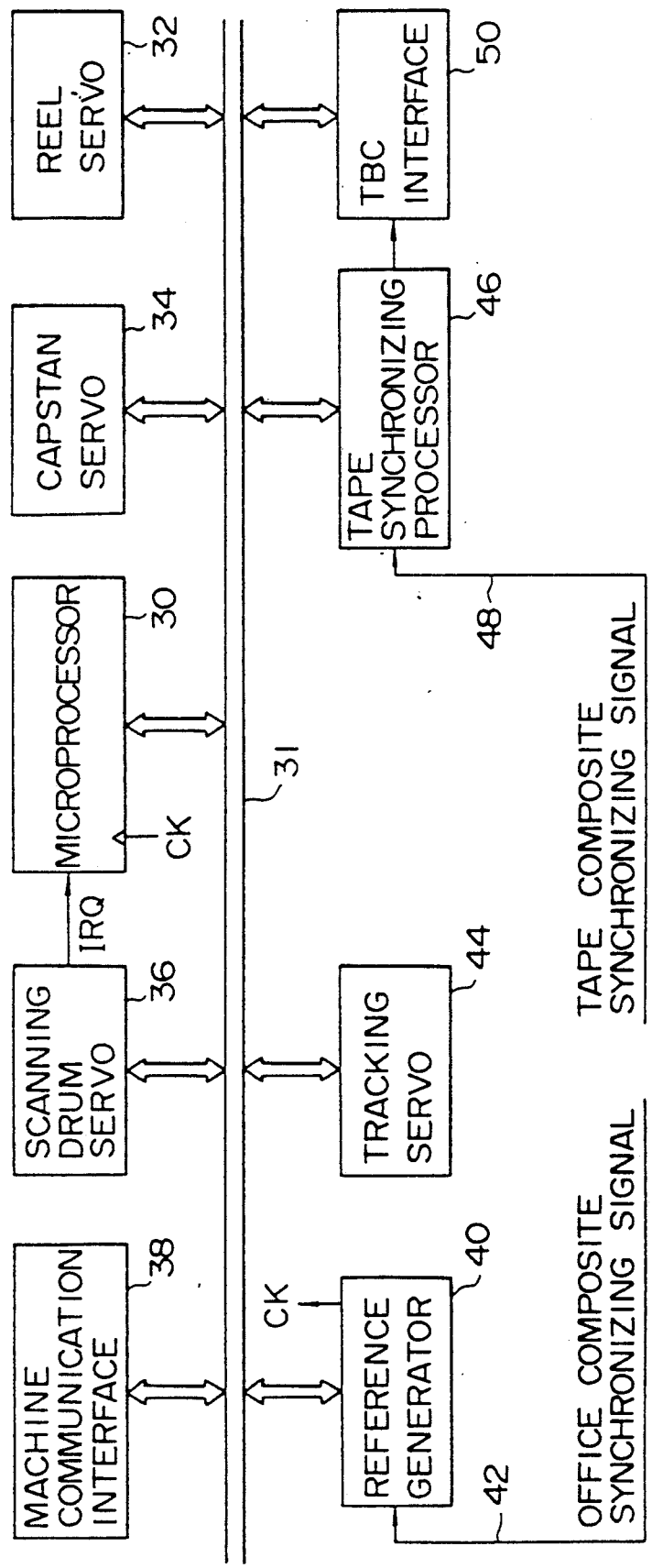
FIG. 6 is a block diagram illustrating construction of a servo control device for a VTR according to the prior art.

Referring to FIG. 5 which shows the construction of drum servo circuit 310, an FG 312 and a PG 313 are connected to A drum motor 311. Drum FG pulse and a drum PG pulse are supplied from FG 312 and PG 313 to a delay circuit 314, respectively. The PG pulse from delay circuit 314 is supplied to a first latch 315, and is also supplied as a reset signal to a ¼ frequency divider 316. The FG pulse from FG 312 is also supplied to the frequency divider 316. An output from frequency divider 316 is supplied to latch 315. Latch 315 is connected through an input port 317 to the data bus 302.

Clock CK is supplied to a counter 318, and CTL pulse Ssr is also supplied as a reset signal to counter 318. An output from counter 318 is supplied to a second latch 319. The output from frequency divider 316 is supplied to both latch 319 and microprocessor 301. Latch 319 is connected to data bus 302.

A driving amplifier 321 is connected to drum motor 311, and a driving signal from microprocessor 301 is supplied through a D-A converter 322 to amplifier 321.

Now, operation of each servo control in the preferred embodiment of the present invention will be described.

In the reel servo circuit 220 shown in FIG. 3, reel FG pulses from 700 waves per rotation for example, are output from each of FGs 223 and 224 of reel motors 221 and 222.

The FG pulses from the FGs 223 and 224 are counted by counters 225 and 226, respectively, and the count values from counters 225 and 226 are fetched by microprocessor 201 a period of V/6. In microprocessor 201, a rotational amount of each reel motor per unit time, i.e., a rotational speed $\omega$ is detected on the basis of a difference between the previous count value and the present count value. The rotational speed reaches 70 rps, for example.

Further, in microprocessor 201, a total tape amount is first obtained on the basis of the count values of both reel FG pulses and the count value of the capstan FG pulses per unit time. Subsequently, diameters Rs and Rt of tape windings around the supply reel and the take-up reel are also detected on the basis of rotational amounts of both the reel motors per unit time. Then, a tape running speed Vmt is obtained from the diameter of the take winding around the tape-up reel and the rotational speed of the take-up reel, and a difference between the tape running speed Vmt and a command set speed Vcm, i.e., a speed error $V\epsilon$ is detected.

Further, in microprocessor 201, torques Tq necessary for supply reel motor 221 and take-up reel motor 222 are obtained in the following manner, and required driving signals are supplied through D-A converters 235 and 236 to amplifiers 233 and 234, respectively.

A torque Tqs necessary for the supply reel motor 221 is the sum of the product of a tension Ts converted from the speed error and the diameter Rs of the tape winding and the product of a moment of inertia Is depending upon the diameter Rs and a set acceleration Acm. That is, torque Tqs is expressed as follows:

$$Tqs = Ts \cdot Rs + Is \cdot Acm$$

On the other hand, a torque Tqt necessary for take-up reel motor 222 is the sum of the product of a tension Tt set in accordance with a command and the diameter Rt of the tape winding and the product of a moment of inertia It depending upon the diameter Rt and the set acceleration Acm. That is, torque Tqt is expressed as follows:

$$Tqt = Tt \cdot Rt + It \cdot Acm$$

As mentioned above, data from the tension sensor 231 is fetched by the microprocessor 201 with period of V/12, and is fed back to the driving signals for driving both reel motors 221 and 222 so as to make tension of the tape path constant.

In capstan servo circuit 240 shown in FIG. 4, capstan FG pulses of 90 per rotation, for example, are output from FG 242 of capstan motor 241. Clock CK during the FG pulse period is counted by counter 243, and the count value in every FG pulse period is fetched by microprocessor 201. In microprocessor 201, a rotational speed $\omega$ of capstan motor 241 is detected on the basis of the count value from counter 243, and a difference between the rotational speed $\omega$ and a command rotational speed $\omega$ cm, i.e., a rotational speed error $\omega\epsilon$ is detected.

In phase comparator 244, the phase of reference CTL pulse Ssr from delay circuit 245 is compared with the phase of the reproduced CTL pulse from head 246, and a phase error data from comparator 244 is fetched by the microprocessor 201 at the rate of once in every three times of the period of V/6 (i.e., with the period of V/2). In microprocessor 201, the phase error is converted into a rotational speed error $\omega\delta$.

Further, in microprocessor 201, a torque necessary for capstan motor 241 is obtained on the basis of the sum of the rotational speed errors $\omega\epsilon$ and $\omega\delta$, and a required driving signal is supplied through D-A converter 252 to amplifier 251.

Further, a forward or reverse rotational direction signal is formed according to a command from the system control system 10, and is supplied through output port 253 to amplifier 251.

In drum servo circuit 310 shown in FIG. 5, drum FG pulses of 48 waves per rotation, for example, are output from FG 312, and PG pulse of one wave per rotation is output from PG 313 of the motor 311.

The FG pulse, divided in frequency into ¼ in frequency divider 316, interrupts microprocessor 301, latches PG pulse from delay circuit 314 in latch 315, and latches output from counter 318 in latch 319.

Since the rotational speed of the drum is set to 150 rps in the D-1 type VTR as mentioned above, the interrupt period of the frequency-divided FG pulse becomes 1.1 mS, and the repetition frequency of the PG pulse becomes 150 Hz.

Substantially as in capstan servo circuit 240 mentioned above, in drum servo circuit 310 clock CK is counted by counter 318 during the period of reference CTL pulse Ssr, and count value is fetched by the microprocessor 301 through latch 319 at every frequency-divided FG pulse period.

Further, a phase data of delayed PG pulse in the latch 315 is fetched by microprocessor 301 through input port 317 at every frequency-divided FG pulse period, and it is determined whether or not the phase data is a start phase on the basis of its polarity. If it is determined that the phase data is a start phase, data in the latch 319 at this time is adapted as a start data.

The start data is subtracted from the data in latch 319 to be subsequently fetched at every frequency-divided FG pulse period.

Further, in microprocessor 301, a reference data for the drum servo is formed from the adjustment data previously stored in nonvolatile memory 206 and the frequency data of the external reference signal (office composite synchronizing signal).

This reference data is not only a speed reference but also a phase reference, and it is compared with the result of the above subtraction at every frequency-divided FG pulse period.

A driving signal corresponding to the error thus obtained is supplied through D-A converter 322 to amplifier 321. Accordingly, in drum control system 300, both the speed servo and the phase servo are effected per by rotation of the motor 311.

Further, in fast forward mode, the rotational speed of drum motor 311 is reduced in proportion to tape speed data fed from microprocessor 201 of tape movement control system 200.

Additionally, since a the amount of data communicated between tape movement control system 200 and drum control system 300 is small, interface RAM 305 and RAM 303 can be accommodated in the same package.

According to the present invention as described above, the drum servo circuit is controlled by one of a pair of microprocessors, and the reel servo circuit and the capstan servo circuit are controlled by the other microprocessor. Accordingly, the burden on each microprocessor is relatively light, and interrupt processing can be performed with predetermined timing so that servo performance is improved. Furthermore, tape moving can be controlled smoothly and quickly.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. In an apparatus for recording and reproducing a video signal on a magnetic tape, the apparatus being operable in a plurality of modes and includinga rotary magnetic recording and reproducing head scanning the tape between supply and take-up reels on which the tape is wound, a capstan for driving said magnetic tape from said supply reel and past said rotary magnetic head to said take-up reel and means for receiving mode selecting command signals, a servo control device comprising:

first servo means for generating a first characteristic signal indicative of a rotational characteristic of said rotary magnetic head and controlling rotation of said rotary magnetic head according to a first control signal;

second servo means for generating a second characteristic signal indicative of a rotational characteristic of said supply reel and third characteristic signal indicative of a rotational characteristic of said take-up reel, controlling rotation of said supply reel according to a second control signal, and controlling rotation of said take-up reel according to a third control signal.

third servo means for generating a fourth characteristic signal indicative of a rotational characteristic of said capstan and controlling rotation of said capstan according to a fourth control signal;

a first microprocessor for periodically receiving said first characteristic signal and generating said first control signal based on said received first characteristic signal;

a second microprocessor for periodically receiving said second, third and fourth characteristic signals and generating said second , third and fourth control signals based respectively on said received second, third and fourth characteristic signals; and control means for controlling said first and second microprocessors, so as to operate the recording and reproducing apparatus in a mode determined according to one of said mode selecting command signals.

2. The servo control device as in claim 1, further comprising measuring means for measuring tension in said magnetic tape during movement thereof, and wherein said second microprocessor periodically receives as a fifth characteristic signal an output from said measuring means and on the basis of said received fifth characteristic signal generates said second and third control signals so as to control the tension in said magnetic tape.

3. The servo control device as in claim 2, further comprising reference signal generating means for generating a reference signal based on an external composite synchronizing signal supplied to the reference signal generating means, and wherein said first and second microprocessors respectively receive said reference signal and respond to receipt of said signal by independently obtaining the respective characteristic signals.

4. The servo control device as in claim 3, further comprising nonvolatile memory means for storing, at the time of production or maintenance of the apparatus, adjustment data that varies from apparatus to apparatus, and wherein said first and second microprocessors read said adjustment data from said monvolatile memory means according to said modes and use said adjustment data in generating said control signals.

5. The servo control device as is claim 1, wherein said control means comprises a third microprocessor.

* * * * *